Patented July 14, 1925.

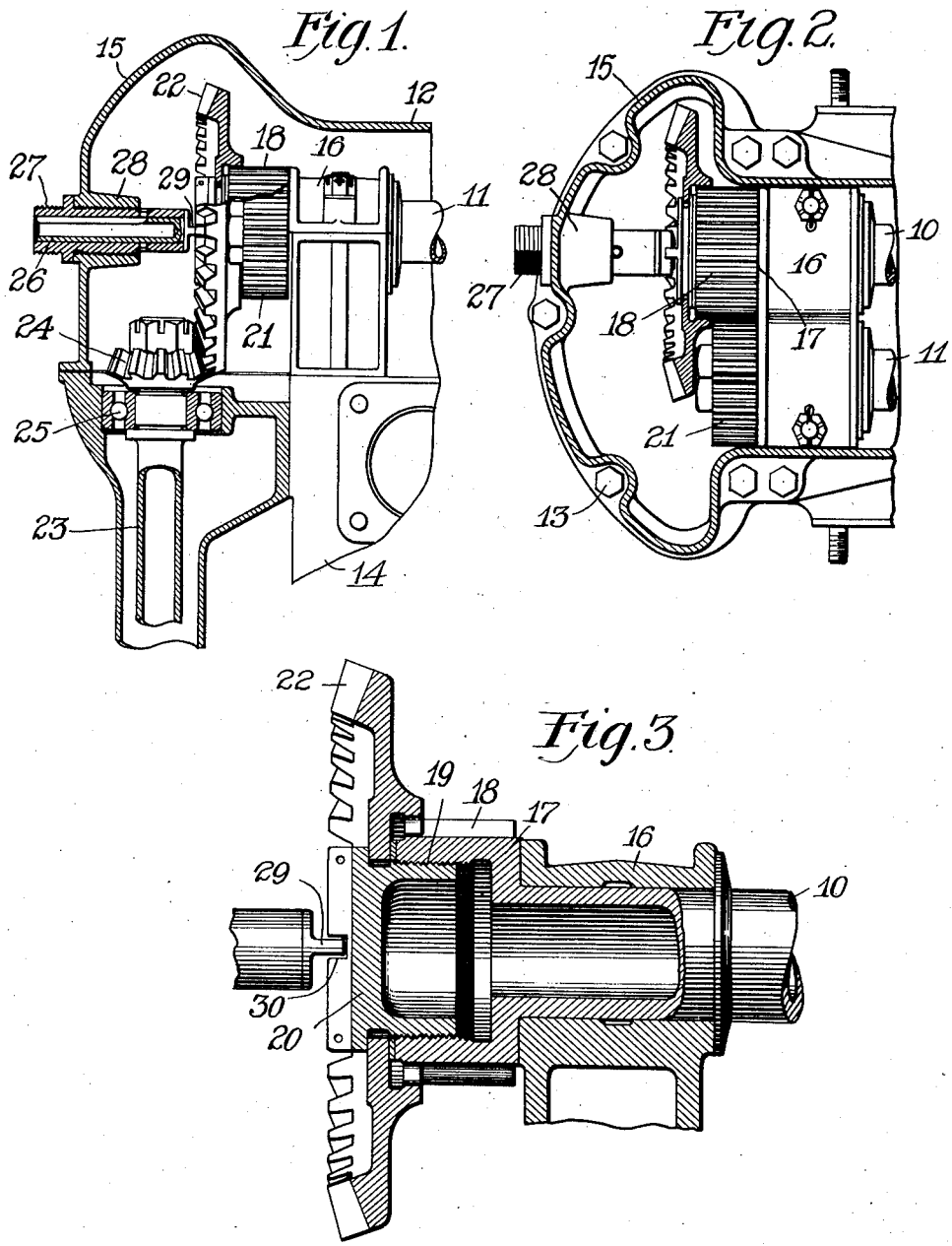

1,545,684

UNITED STATES PATENT OFFICE.

ARTHUR NUTT, OF GARDEN CITY, AND ADOLPH MOSES, OF HEMPSTEAD, NEW YORK, ASSIGNORS TO CURTISS AEROPLANE & MOTOR COMPANY, INC., OF GARDEN CITY, NEW YORK, A CORPORATION OF NEW YORK.

INTERNAL-COMBUSTION MOTOR.

Application filed May 15, 1922. Serial No. 561,253.

*To all whom it may concern:*

Be it known that we, ARTHUR NUTT and ADOLPH MOSES, citizens of the United States, residing at Garden City and Hempstead, respectively, in the county of Nassau and State of New York, have invented certain new and useful Improvements in Internal-Combustion Motors, of which the following is a specification.

Our invention relates to internal combustion motors. An object of the invention is to eliminate certain motor parts heretofore considered essential, by reorganizing the gearing of the cam shaft drive. Such reorganization of the gearing is advantageous also in that the weight of the motor considered as a whole is somewhat reduced. In an aeronautical motor, a reduction in weight per horse power is very desirable.

A further object of the invention is to so relate and mount certain of the gears of said drive that an adjustment of one gear relatively to another is instrumental in effecting an accurate adjustment of the cam shaft, and the gear mounting is such that one of said gears is made to serve a two-fold purpose, i. e., on the one hand as a gear in the ordinary sense, and on the other hand as a spline for obtaining a spline connection.

Other objects and advantages will be hereinafter pointed out.

In the drawings, wherein the preferred embodiment of the invention is illustrated;

Figure 1 is a longitudinal vertical sectional view of the cylinder head cover, showing the gearing arrangement of the cam shaft drive;

Figure 2 is a sectional view taken at right angles to the sectional view of Figure 1; and, Figure 3 is an enlarged longitudinal vertical sectional view showing in detail the gear mounting at one end of the cam shaft.

In the embodiment of the invention selected for illustration, two parallel cam shafts 10—11 are provided, both of said shafts being mounted overhead and appropriately enclosed in a suitable cylinder head cover 12, bolted as at 13 to the cylinder block 14 of the motor. Said cylinder head cover 12 is enlarged at one end as at 15 to likewise enclose the cam shaft gearing later to be described. Both cam shafts 10 and 11 are hollow throughout to admit of the circulation of oil therethrough to the total number of cam shaft bearings, but one of which, designated as 16, is shown. One or the other of the cam shafts 10—11 is enlarged at one end as indicated at 17, said enlargement being provided exteriorly with gear teeth 18 which serve also as splines. Interiorly said enlargement 17 is hollowed out and threaded as at 19 to receive a suitable plug or cap 20 which is adapted to close one end of the hollow shaft. In the drawings it is cam shaft 10 which we have shown thus enlarged and formed. The cam shaft 11 differs only in that the teeth of the gear 21 formed upon its enlarged end are not extended as are the teeth 18 of the cam shaft 10, since the splines are required at the end of but one of the cam shafts 10—11. The gears formed on the ends of the cam shafts 10—11 mesh.

Upon the extended portion of the teeth 18 of the gear formed on the end of the cam shaft 10 a bevel gear 22 is mounted. Said gear 22 has a spline connection with the shaft 10 and is held in place upon the cam shaft 10 by the plug or cap 20 threaded in the end of the shaft. To provide for an accurate adjustment of the cam shafts 10—11 said gear 22 is provided with a number of gear teeth exceeding the number of splines or gear teeth 18 formed on the end of the shaft 10. Preferably, the variance is slight, and in the embodiment shown, the number of gear teeth exceeds the number of splines by one. Thus organized, it will be observed that the teeth 18 serve a two-fold purpose. Throughout the greater portion of their length the teeth 18 are in mesh with the teeth of the gear 21 that the two cam shafts 10 and 11 may be rotated simultaneously and at the same speed, whereas throughout the remaining portion of their length said teeth 18 function as splines so related to the gear 22 that adjustment of the latter relatively thereto provides for cam shaft adjustment and at the same time enter into and constitute elements of the spline connection between the gear 22 and the shaft 10 upon which said gear is mounted.

The means by which power is transmitted to the gear 22 from the crank shaft includes a shaft 23 driven directly off the crank shaft (not shown), said shaft having a bevel gear 24 mounted thereon, which gear 24 is in mesh with the gear 22. The shaft 23 is mounted in suitable bearings 25, but one of which is shown.

In addition to its function as a closure for the end of the shaft 10 the plug 20 serves as a driving means for a shaft 26 journalled in a bushing 27 threaded in enlargement 28 of the cylinder head cover. Said shaft 26 is provided at its inner end with a tongue 29 which is adapted to engage in a groove 30 formed in the cap or plug 20. Through such an arrangement an appropriate tongue and groove connection between the cam shaft 10 and the shaft 26 is provided. The function of the shaft 26 is that of a driving shaft for an engine accessory such as a tachometer (not shown). Thus arranged, a very simple accessory drive is provided.

It will be seen from the foregoing that a most efficient and compact gearing arrangement has been provided, and although much simplified, provision made for cam shaft adjustment by the rotation adjustment of the gear 22 relatively to the gear formed on the end of the cam shaft 10.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What is claimed is:—

1. In combination, a shaft, a gear on said shaft, a gear having a spline connection with said first mentioned gear, the number of teeth formed upon said last mentioned gear being at variance with the number of teeth formed on said first mentioned gear whereby thru adjustment of the one gear relatively to the other gear, adjustment may be effected, and a driving means for said last mentioned gear.

2. The combination, in an internal combustion motor, of a cam shaft, a gear on said shaft, a gear having a spline connection with said first mentioned gear, the number of teeth on said last mentioned gear being at variance with the number of teeth on said first mentioned gear, whereby through adjustment of the one gear relatively to the other an adjustment of the cam shaft may be affected, and means engaging the teeth of said last mentioned gear for driving said cam shaft.

3. The combination, in an internal combustion motor, of a cam shaft, a gear on said shaft, a second gear, a spline connection between the two gears in which the teeth of said first mentioned gear enter into and actually constitute the splines of said connection, the number of teeth on said second gear being at variance with the number of teeth on said first mentioned gear, whereby through the adjustment of one gear relatively to the other an adjustment of the cam shaft may be affected, and means engaging the teeth of said second gear for driving said cam shaft.

4. The combination, in an internal combustion motor, of a cam shaft, splines formed on said shaft, a gear mounted on said shaft, and fastened thereto by its engagement with said splines; the number of teeth on said gear being at variance with the number of splines, whereby through adjustment of the gear relatively to the shaft an adjustment of said shaft may be affected, and means engaging the teeth of said gear for driving said shaft.

In testimony whereof we hereunto affix our signatures.

ARTHUR NUTT.
ADOLPH MOSES.